(No Model.) 2 Sheets—Sheet 1.
H. L. JACOBS & T. H. STAGG.
ROAD SCRAPER.
No. 432,942. Patented July 22, 1890.
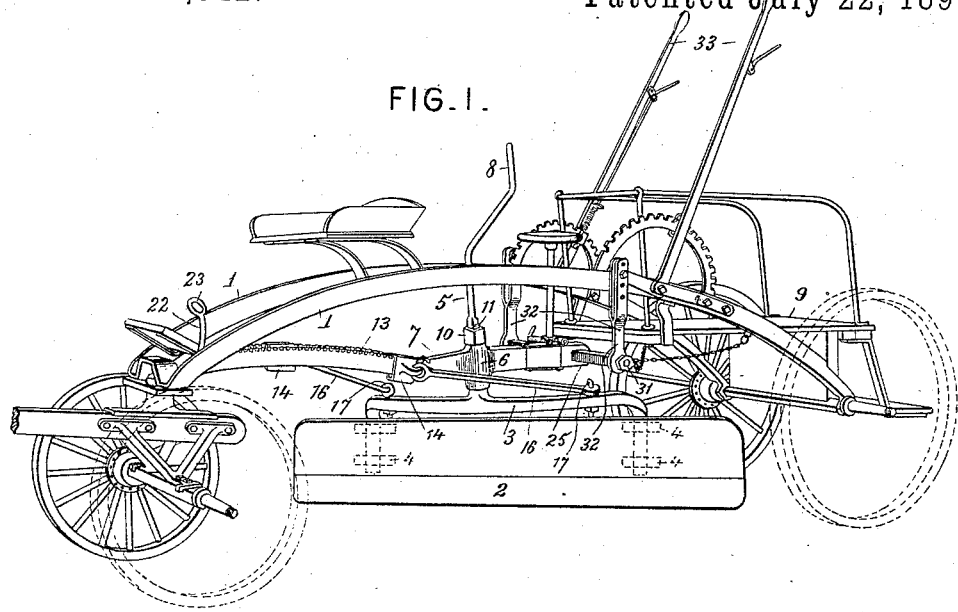
FIG. I.
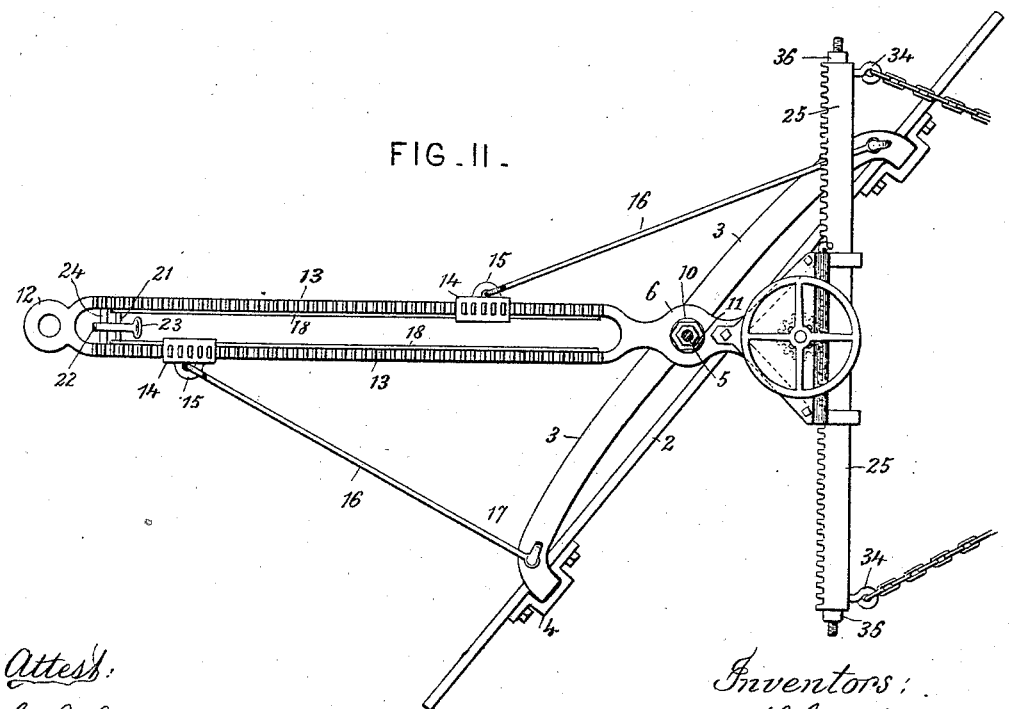
FIG. II.
Attest:
Geo. T. Smallwood,
F. A. Hopkins
Inventors:
Henry L. Jacobs,
Thomas H. Stagg,
By Knight Bros. attys (No Model.) 2 Sheets—Sheet 2.
H. L. JACOBS & T. H. STAGG.
ROAD SCRAPER.
No. 432,942. Patented July 22, 1890.
FIG. III.
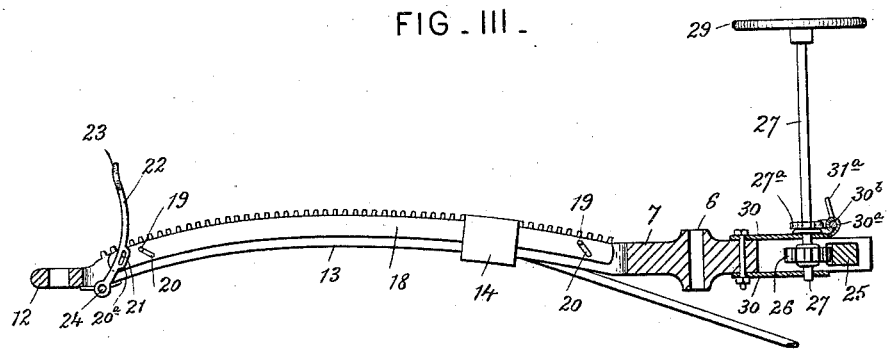
FIG. IV.
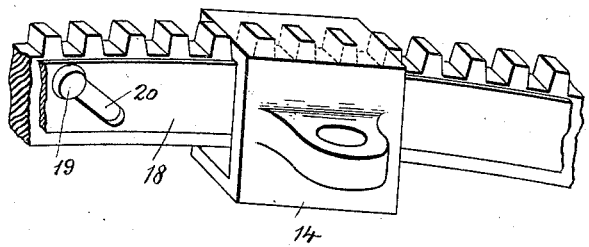
Attest:
Geo. T. Smallwood.
f. A. Hopkins.
Inventor:
Henry L. Jacobs
Thomas H. Stagg.
By Knight Bros. Attys

UNITED STATES PATENT OFFICE.

HENRY L. JACOBS AND THOMAS H. STAGG, OF COLUMBUS, OHIO, ASSIGNORS TO THE KILBOURNE & JACOBS MANUFACTURING COMPANY, OF SAME PLACE.

ROAD-SCRAPER.

SPECIFICATION forming part of Letters Patent No. 432,942, dated July 22, 1890.

Application filed December 30, 1889. Serial No. 335,343. (No model.)

*To all whom it may concern:*

Be it known that we, HENRY L. JACOBS and THOMAS H. STAGG, citizens of the United States, residing at Columbus, in the county of Franklin and State of Ohio, have invented certain new and useful Improvements in Road-Scrapers, of which the following is a full, clear, and exact specification.

Our improvement relates to that class of road-grading machines which is designed for leveling and grading railroads, driveways, ditches, &c., and has a large cutter bar or blade and mold-board to cut and scrape the earth and deliver it either to the center of the road-bed or fill, or from the center of a ditch to the sides; and the object of our invention is to combine in a device of this kind simplicity of construction with great strength and durability, and convenience of adjustment of the blade or shovel to any position necessary to its various uses, and to provide for the ready reversal of the blade from right to left, and vice versa, so that the device can be used either for the purposes of plowing to cut a deep furrow or as a scraper to level the earth for diverse purposes.

Our invention consists in features of novelty, which will now be described in connection with the accompanying drawings, and then more particularly pointed out in the claims hereto annexed.

In the said drawings, Figure I is a perspective view of a scraper embodying our improvements, certain parts being removed for clearer illustration. Fig. II is a detached view looking downward upon the blade and the center reach, hereinafter described; and Fig. III is a side elevation of the center reach, hereinafter described, portions being broken away. Fig. IV is an enlarged detail.

In the said drawings, 1 1 are the ordinary arches extending from the rear to the front axle, and from which the blade 2 is, as usual, suspended.

3 is a yoke secured to the blade by means of clips or clamps 4, or it may be secured thereto in any other suitable manner. Made integrally with this yoke 3 and projecting upwardly therefrom at or about its middle is a stem 5, which is journaled in a vertical sleeve or journal-box 6, the latter being preferably made integral with the center reach 7, and carries at its upper end, above the main arches, the operating-handle 8, by means of which the operator, standing on the platform 9, may revolve the blade until it is at the desired angle with the line of draft. The stem 5 is provided with a burr or nut 10, preferably threaded on said stem, and provided with a key 11 for preventing the friction ordinarily produced in revolving the blade, unscrewing said burr, the burr thus forming an ample support on the center reach for the blade and the yoke 3.

The center reach 7 is pivoted at its forward end by means of the king-bolt, which passes through the perforated head 12 to the front of the machine, and it is bifurcated throughout the greater portion of its extent, or at least from the journal-box 6 to the head 12, so as to form two rack-bars 13, running parallel with each other and being provided with teeth on their upper sides. Fitted on and encompassing each of these racks is a dog or toothed slide 14, which has teeth or cavities on its upper side adapted to engage with the teeth on said racks. Each of these slides or dogs is provided with an eye or ring 15, by means of which and guy-bars 16 said slides are secured to eyebolts 17 on the outer ends of the yoke 3. By this arrangement it will be seen that the location of the dogs or slides 14 determines the angle at which the blade 2 is to be retained, and when it is desired to change such angle it will be necessary first to elevate the teeth of the dogs out of contact with the teeth of the racks, and to this end we provide on the inner side of each rack or bar 13 a plain plate or bar 18, extending throughout the length of each rack, and being secured to each rack at both ends by means of pins 19, passing through oblique cam-slots 20 in the bars 18 into the racks 13, while at their forward ends they are also secured to a bar 21, which passes through a slot 20ª in or is otherwise secured to a lever 22, having a foot-rest or handle 23, and being pivoted between the rack-bars 13 on a shaft 24, extending across the rack-bars. This lever 22, being within the reach of the foot or hand of the operator or driver, it will be seen that when it is desired to change the angle of the blade he will press upon the handle 23, which will cause the plates 18 to ride forward and upward on the pins 19 above the teeth of the rack-bars 13, carrying upward with them the dogs or slides 14, and thereby disengaging the teeth of the dog from the teeth of the rack and presenting a plain surface for the said dogs to slide upon. Each dog, it will be seen, entirely encompasses the rack with which it engages, but is slightly deeper than said rack, so as to permit of the upward movement of the dog. When the dogs have been thus elevated, the blade may be shifted to any desired angle through the medium of the crank 8 or otherwise.

To enable the adjustment of the blade from right to left or transversely to the line of draft, we provide the rear end of the center reach 7 with a bifurcation, through which passes a rack-bar 25, having teeth on its side, and journaled in this bifurcation and engaging with the rack 25 is a pinion 26, having a vertical operating stem or shaft 27, provided with a hand-wheel 29 within reach of the operator, who may stand on the platform 9, the upper and lower sides of the bifurcated end being provided with plates 30, in which the stem 27 is journaled. The rear end of the upper one of these plates 30 is curled up, so as to form a journal-box 30$^a$, in which a short shaft 30$^b$, having an operating-handle 31$^a$, is journaled. This shaft 30$^b$ is also provided with a pawl adapted to be forced into engagement with a ratchet-wheel 27$^a$, keyed on the stem 27, and thus prevent the turning of the stem and the consequent accidental shifting of the bar 25. Thus it will be seen that by turning the hand-wheel 29 the rear end of the center reach 7 may be shifted throughout the extent of the rack-bar 25; but inasmuch as the rear end only is moved it is obviously essential that the rack-bar 25 should be swung in such a manner as to enable it to adjust itself to the varying position of the rear end of the reach, and to this end we provide the ends of the rack-bar 25 with prismatic portions 36, upon which are secured by means of nuts 31 supporting-links 32, each of which latter is secured at its upper end to the shorter arm of one of the bell-crank hand-levers 33, thus not only allowing the ends of the rack 25 to go and come, as the center reach 7 is oscillated, but enabling the vertical adjustment of the blade by manipulating the levers 33 in the usual manner.

To limit the movement of the ends of the bar 25 and stay the same, the latter is provided at each end with an eyebolt 34, to which are secured chains passing backward and secured to the arches of the machine.

The links 32 are preferably bifurcated, as shown, and provided with a number of perforations, in any of which the arms of the levers 33 may be pivoted.

Having thus described our invention, the following is what we claim as new therein and desire to secure by Letters Patent—

1. In a road-scraper, the combination, with the blade and suitable supporting devices, of a yoke secured to said blade and having an upwardly-projecting stem made integrally therewith and journaled in said supporting devices, substantially as set forth.

2. In a road-scraper, the combination of the yoke for supporting the blade, having an upwardly-projecting stem made integrally therewith, the center reach in which said stem is journaled, a handle or crank on the upper end of said stem, and means for locking the blade at the desired angle, substantially as set forth.

3. The combination, with the yoke 3 for supporting the blade, having the stem 5, of the center reach having two rack-bars, said stem 5 being journaled in said reach, dogs engaging with said racks and being connected to said yoke, and lifting-plates adapted to raise said dogs out of engagement with said racks, substantially as set forth.

4. The combination, in a road-scraper, of the yoke for supporting the blade, having the upwardly-projecting stem 5, the center reach in which said stem is journaled, having two racks, dogs engaging said racks and being connected with said yoke, the lifting-plates for raising said dogs, a lever for operating said plates, and a crank for revolving the stem 5, substantially as set forth.

5. In a road-scraper, the combination, with the yoke 3 for supporting the blade, having the upwardly-projecting stem 5, the center reach having a journal-box in which said stem is journaled, a burr secured to said stem above said journal-box, and guys connecting the outer ends of said yoke with said reach, substantially as and for the purposes set forth.

6. In a road-scraper, the combination, with the main arches, of the center reach for supporting the blade, a rack-bar suspended from the main arches and supporting the rear end of said center reach, a pinion journaled in the end of said center reach and engaging said rack-bar, and the stem for operating said pinion, substantially as set forth.

7. In a road-scraper, the combination, with the main arches and the blade, of the center reach supporting said blade, said center reach having its rear end bifurcated, a rack-bar passing through the rear end of said center reach, links supporting said rack, a pinion engaging said rack, a stem for operating said pinion, having a hand-wheel 29, and bell-crank levers to which said links are connected, substantially as set forth.

8. In a road-scraper, the combination, with the blade, of the yoke 3, secured to said blade, the stem 5, projecting upwardly from said yoke, the center reach through which said stem passes and in which said stem is journaled, having its forward end formed into two racks, dogs or slides encompassing and engaging said racks, lifting-plates passing through said slides and being secured, respectively, to said racks by means of slot-and-pin connection, an operating-lever, a bar secured to said plates and connected with said lever, whereby the movement of said lever will elevate said plates and slides above the teeth of the segment-racks, and guys securing each of said dogs or slides to the outer ends of said yoke, substantially as set forth.

HENRY L. JACOBS.
THOMAS H. STAGG.

Witnesses:
J. H. HUSSEY,
FRED W. HUBBARD.